United States Patent [19]
Jolly

[11] Patent Number: 5,244,478
[45] Date of Patent: Sep. 14, 1993

[54] REAGENTLESS SEPARATOR FOR REMOVAL OF ACID GASES AND THEIR HYDROLYSIS PRODUCTS FROM SOLUTIONS

[75] Inventor: Clifford D. Jolly, Roseburg, Oreg.

[73] Assignee: Umpqua Research Company, Myrtle Creek, Oreg.

[21] Appl. No.: 728,979

[22] Filed: Jul. 12, 1991

[51] Int. Cl.$^5$ .................................. B01D 53/22
[52] U.S. Cl. .................................. 95/46; 204/153.2; 210/321.72; 210/501; 210/502.1; 96/6
[58] Field of Search .............. 204/153.2; 210/321.6, 210/321.71, 321.72, 501, 502.1; 55/16, 158

[56] References Cited
U.S. PATENT DOCUMENTS

4,209,299 6/1980 Carlson ........................... 204/153.2

Primary Examiner—Frank Sever
Attorney, Agent, or Firm—James L. Jackson

[57] ABSTRACT

A reagentless separator for removal of hydrolyzed species such as bicarbonate or carbonate to free or dissolved acid gases from a solution comprises a flow-through solid-phase acid bed through which the solution is passed for decreasing the pH of the solution and thus converting the hydrolyzed species into a free or dissolved acid gases. The converted hydrolyzed species is then separated from the solution by a gas permeable membrane degasser having an acid gas permeable membrane across which a partial pressure gradient is established. The solution may be an aqueous solution containing $CO_2$ or any other hydrolyzed gas. The dissolved acid gas separator will be especially useful on space craft missions where water must be recycled.

20 Claims, 9 Drawing Sheets

| SOLID PHASE ACID | PARTICLE SIZE | QUANTITY OF ACID | QUANTITY OF SOLUTION | EQUILIBRIUM pH | | TIC CONC. AFTER 10 MIN. $N_2$ SPARGE mg/l |
|---|---|---|---|---|---|---|
| | | | | DEIONIZED WATER | BICARBONATE SOLUTION (CONC AS C) | |
| MOLYBDENUM (VI) OXIDE | POWDER | 0.5 g | 100 ml | 3.77 | 4.8 (6.0 mg/l) | - |
| TUNGSTEN (VI) | POWDER | 0.2 g | 100 ml | 5.6 | - | - |
| MOLYBDIC ACID | POWDER | 0.1 g | 30 ml | <4.7 | <5.0 (38 mg/l) | ND@1 |
| TUNGSTIC ACID | POWDER | 0.3 g | 100 ml | 4.1 | 6.9 (130 mg/l) | ND@1 |
| CuO/PHOSPHORIC ACID | 10×50 MESH | 3.0 g | 100 ml | <4 | - | - |
| NAFION NR 50 | 10×35 MESH | 2.0 g | 100 ml | 7 | 3.0 (20 mg/l) | ND@1 |
| AMBERLITE IR-200 | 20×50 MESH | 22.0 g | 100 ml | 7 | 3.0 (20 mg/l) | ND@1 |

| MATERIAL | $CO_2$ GAS PERMEABILITY | $H_2O$ VAPOR TRANSMISSION | CONFIGURATION | INF. INORGANIC CARBON CONC | EFF INORGANIC CARBON CONC | CONTACT TIME | PRESSURE GRADIENT |
|---|---|---|---|---|---|---|---|
| FEP | 1670 cc 100 IN.$^2$ DAY atm FOR 1 mil THICK | 0.4 g 100 IN.$^2$ DAY atm FOR 1 mil THICK | 0.0005 IN. THICK FILM | 70 mg/l | 0 mg/l | 477 s/cm$^2$ | 0.1 atm |
|  |  |  | 0.006 IN. WALL TUBING | 12 mg/l | 2 mg/l | 53 s/cm$^2$ | 0.1 atm |
| TFE | 2181 cc 100 IN.$^2$ DAY atm FOR 1 mil THICK | — | 0.001 IN. THICK FILM | UNABLE TO MAINTAIN AN INTEGRAL MEMBRANE |  |  | 0.1 atm |
|  |  |  | 0.006 IN. WALL TUBING | 17 mg/l | 5 mg/l | 36 s/cm$^2$ | 0.1 atm |
|  |  |  | 0.002 IN. WALL TUBING | 9 mg/l | 0 mg/l | 72 s/cm$^2$ | 0.1 atm |
| PFA | 2260 cc 100 IN.$^2$ DAY atm FOR 1 mil THICK | — | 0.006 IN. WALL TUBING | 40 mg/l | 24 mg/l | 16 s/cm$^2$ | 0.1 atm |
| SILOXANE | 4.4 x 10$^5$ cc 100 IN.$^2$ DAY atm FOR 1 mil THICK | 3929 g 100 IN.$^2$ DAY atm FOR 1 mil THICK | 0.0065 IN. WALL TUBING | 42 mg/l | 2 mg/l | 102 s/cm$^2$ | 0.1 atm |

REAGENTLESS SEPARATOR FOR REMOVAL OF ACID GASES AND THEIR HYDROLYSIS PRODUCTS FROM SOLUTIONS

FIELD OF THE INVENTION

This invention relates generally to the removal of acid gases and their hydrolysis products from solutions such as, for example, the removal of inorganic carbon present as dissolved carbon dioxide gas, bicarbonate ion, and/or carbonate ion from dilute aqueous solutions. More specifically, the present invention concerns a flow-through solid-phase acid bed, integrated with a Gas-permeable membrane degasser which functions by passing a sample stream through the acid bed to lower the pH of the solution sufficiently to convert any hydrolyzed species (e.g. bicarbonate or carbonate) present to free or dissolved gas (e.g. $CO_2$) and by then separating the free or dissolved gas from the sample stream by applying a partial pressure gradient across the gas permeable membrane degasser.

BACKGROUND OF THE INVENTION

The presence of inorganic carbon (as $CO_2$, $HCO_3^-$, and $CO_3^=$) in samples to be analyzed for total organic carbon (TOC) creates two adverse affects: a positive interference with the $CO_2$ detector and a decrease in the oxidation rate of organics. It is desirable to remove inorganic carbon (IC) to allow direct TOC measurement of reclaimed water streams.

Inorganic carbon (IC) as dissolved $CO_2$ causes positive interference with total organic carbon (TOC) measurements, and as carbonates, inorganic carbon adversely affects oxidation of organics. Therefore, it is desirable to remove inorganic carbon (IC) to allow direct TOC measurement of reclaimed water streams. The most sensitive standardized method of total carbon measurement, with a reported detection limit of 50 ug organic carbon/liter, which is described in STANDARD METHODS FOR THE EXAMINATION OF WATER AND WASTE WATER, 16th Ed. as follows: Inorganic carbon, present in water as carbonate and/or bicarbonate ions above pH 4-5, is converted to $CO_2$ by addition of aqueous acid (e.g. 10% phosphoric acid). Carbon dioxide is then removed from the sample using an inert gas and carried to a non-dispersive infrared (NDIR) detector to measure $CO_2$ (hence inorganic carbon concentration). The sample is then subjected to UV-persulfate oxidation; the organic carbon is oxidized to $CO_2$ and removed using purge gas. The organic carbon concentration is measured as $CO_2$ in the NDIR detector. This method has significant disadvantages as applied to on-line monitoring of waste streams in microgravity. These disadvantages include the requirement for sample acidification to convert carbonate and bicarbonate to $CO_2$ using an expandable liquid reagent (phosphoric acid). It is also considered disadvantageous to use expandable aqueous persulfate solutions in the Space Station Freedom (SSF) environment because of the weight limitations thereof. Further, transfer of inorganic carbon as $CO_2$ out of the sample using purge gas is a gravity-dependent process which, of course, can be non-functional in the microgravity of the SSF environment. It is therefore considered desirable to provide a reliable gravity independent process for total organic carbon and total inorganic carbon measurement. More specifically, it is considered desirable to provide a reagentless inorganic carbon separator which includes a solid-phase acid module integrated with a $CO_2$-permeable degasser. It is also considered desirable to provide a passive total inorganic carbon (TIC) removal module containing a $CO_2$ adsorbent. The module should remove the TIC and fix it in the solid form in a single process step. Even further, it is considered desirable to provide solid-phase TOC and TIC functional check modules to provide a means of verifying instrument performance without storage of unstable liquid reagents.

The water quality monitor (WQM) hardware presently being developed for the Space Station Freedom does not require persulfate reagents, but at present will require addition of liquid acid and uses centrifical gas/liquid separators. It is considered desirable to provide an alternative to the use of liquid-phase acid reagents such as phosphoric acid and to provide a suitable alternative for the present requirement for purge gas such as nitrogen for removal of dissolved $CO_2$ from water. Further, from the standpoint of use in orbital environments such as space stations and for other interplanetary activities, it is considered desirable to provide a solid-phase system for removal of $CO_2$ without using a purge gas. It is also considered desirable to provide for conversion of carbonate and bicarbonate to $CO_2$ without the addition of an expendable liquid reagent such as phosphoric acid. This would permit elimination of corrosive liquid acids in the space station or space-craft environment.

SUMMARY OF THE INVENTION

It is the general purpose of this invention to provide a reagentless flow-through inorganic carbon separator which is composed of a solid-phase acid module integrated with an acid gas permeable membrane degasser being capable of removing various acid gases including but not limited to $CO_2$, $SO_2$ and $NO_x$ present as dissolved gas and ionic species from solution and more specifically to remove inorganic carbon present as dissolved $CO_2$ gas, bicarbonate ion, and/or carbonate ion from dilute aqueous solution. Though, for purposes of the simplicity, the present invention is discussed herein particularly as it relates to removal of inorganic carbon from an aqueous solution, such is not intended to limit the scope of the invention. A wide range of acid gases may be separated from solution through employment of this invention. Thus, while apparatus is discussed herein particularly for separation of $CO_2$ from aqueous solution, it is within the spirit and scope of this invention that the apparatus and the process will find effective use in the separation of various acid gases from solution. From the standpoint of $CO_2$ separation the concept of the invention is realized as a gravity independent process through the provision of a $CO_2$ separator device consisting of a flow-through solid-phase acid, integrated with a $CO_2$-permeable membrane degasser. The $CO_2$ separator unit functions by passing the sample stream through the acid bed to lower the pH sufficiently to convert any bicarbonate or carbonate present to $CO_2$ gas. The converted $CO_2$ is then separated from the sample stream by applying a partial pressure gradient across the membrane by means of pressure, vacuum or a combination of both.

The solid-phase acid/carbon dioxide permeable membrane $CO_2$ separator which is constructed in accordance with the present invention will achieve conversion of carbonate and bicarbonate to $CO_2$ without addition of an expendable liquid reagent such as phosphoric acid. This is achieved by passing the sample through a solid-phase acid. The solid-phase acid may be either a sulfonated polymer containing adsorbed protons or an inorganic solid. This $CO_2$ separator system also achieves removal of dissolved $CO_2$ from water by means of a $CO_2$-permeable, non-porous membrane without using a purge gas. The inorganic acids are of primary interest for Space Station Freedom (SSF) application for on-line monitoring or waste streams in microgravity.

Integration of this technology with an on-line total organic carbon monitor can be accomplished in several ways. Two possible configurations appear to have particular merit. In accordance with one configuration, the sample stream is pressurized to approximately 7 psig using a syringe loader. The $CO_2$ gas is driven through the membrane and carried to a detector such as a non-dispersive infrared (NDIR) detector using a non-absorptive gas stream. Any combination of pressure/vacuum is suitable as long as there is sufficient partial pressure gradient across the membrane to remove the gas from the liquid stream. According to the second configuration, the sample stream is pumped through the reagentless separator and the $CO_2$ gas is removed by an adsorbent.

It is a principal feature of this invention to provide a method and apparatus for separating from solution acid gases such as $CO_2$, $SO_2$ and $NO_x$, present as dissolved gas and ionic species by passing the solution through a solid-phase acid bed to convert any hydrolyzed gases present to free or dissolved gas and by then separating the gas from the solution by applying a partial pressure gradient across a membrane degasser It is a feature of the present invention to provide for conversion of carbonate and bicarbonate to $CO_2$ without addition of an expendable liquid reagent such as phosphoric acid, which conversion is achieved by passing the sample through a solid-phase acid and by then separating the $CO_2$ from the sample by means of a gas-permeable membrane.

It is also a feature of the present invention to achieve separation of carbonate and bicarbonate from an aqueous sample without necessitating the use of a liquid phosphoric acid or a purge gas such as nitrogen in accordance with conventional technology.

It is another feature of this invention to provide a novel separator for $CO_2$ and other hydrolyzed gases having the advantage of applicability to microgravity.

It is also a feature of this invention to provide a novel hydrolyzed gas separator which significantly minimizes loss of volatile organic compounds during removal of inorganic carbon as compared to using a purge gas.

It is another important feature of the present invention to eliminate the use of corrosive liquid acids in the environment such as in space craft for removal of $CO_2$ and other hydrolyzed gases from aqueous liquid streams.

It is another feature of this invention to provide a $CO_2$ separator that is suitable for the configuration as an orbital replacement unit (ORU).

Among the several features of this invention is noted the provision of an "on-demand" source of acidification, i.e., the solubility of the acid liberating material increases with increasing alkalinity. The result is an acidifier that is minimally consumed when the sample stream pH is already low and releases an increasing amount of acid as the influent pH increases.

It is another feature of this invention to provide a novel $CO_2$ separation system that is designed especially for use on board space stations and other space-craft and which is of simple nature and is reliable in use.

Other and further features of the present invention will become obvious upon an understanding of the following specification, the attached drawing and the appended claims.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

IN THE DRAWINGS

DETAILED DESCRIPTION OF PREFERRED EMBODIMENT

The reagentless separator consists of a solid-phase acid bed integrated with a membrane degasser. Useful membrane degassers for purposes of this invention include hollow fiber, flat sheet and spiral wound membrane configurations. It is a simple flow-through device with no moving parts. The unit functions by directing the sample stream through the solid acid bed to lower the pH of the aqueous solution sufficiently to convert any hydrolyzed gases (e.g. bicarbonate or carbonate) to free gas (e.g. $CO_2$) The gas is then separated from the sample stream by applying a partial pressure gradient across the membrane. The solid-phase $CO_2$ separator achieves conversion of acid gas hydrolysis products such as carbonate and bicarbonate to free or dissolved gas such as $CO_2$ without the addition of an expendable liquid reagent such as phosphoric acid. This is achieved by directing the sample through a solid-phase acid bed which may take the form of a sulfonated polymer containing adsorbed protons or an inorganic solid. Typical reactions occur as follows:

In the case of hydrolyzed $CO_2$ the inorganic carbon is 99.996% present as $CO_2$ below approximately pH 4. It has been demonstrated that both polymeric and inorganic acids are effective at lowering the pH of aqueous solutions containing 20 mg/l carbon (as sodium bicarbonate) to convert the inorganic carbon to $CO_2$, which is then removed.

Removal of dissolved $CO_2$ from water without using a purge gas is achieved utilizing a gas-permeable membrane.

Figure 1:
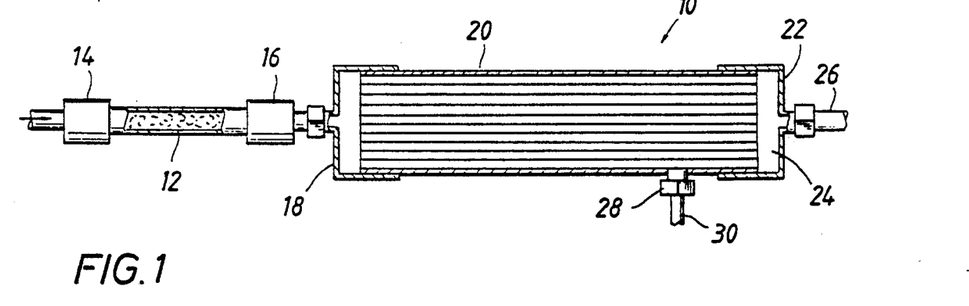
FIG. 1 is a diagrammatic representation of a solid-phase acid separator for acid gases which is constructed according to the teachings of the present invention.

With reference now to FIG. 1, there is schematically illustrated a $CO_2$ separator generally at 10 having a solid-phase acid bed 12 which may conveniently take the form of a column that is packed with a suitable solid-phase acid. The column or bed 12 is provided with an inlet 14 to receive an influent containing inorganic carbon and organics. The column 12 is also provided with an outlet 16 that is appropriately coupled to the inlet 18 of a membrane separator 20. The membrane separator is provided with an outlet 22 at its permeate end 24 which is provided with a tubular connection for conducting inorganic carbon-free effluent to an organic carbon oxidizer. The membrane separator 20 is also provided with a $CO_2$ outlet connection 28 having a conduit coupling 30 through which $CO_2$ is conducted to a $CO_2$ detector.

Figure 2:
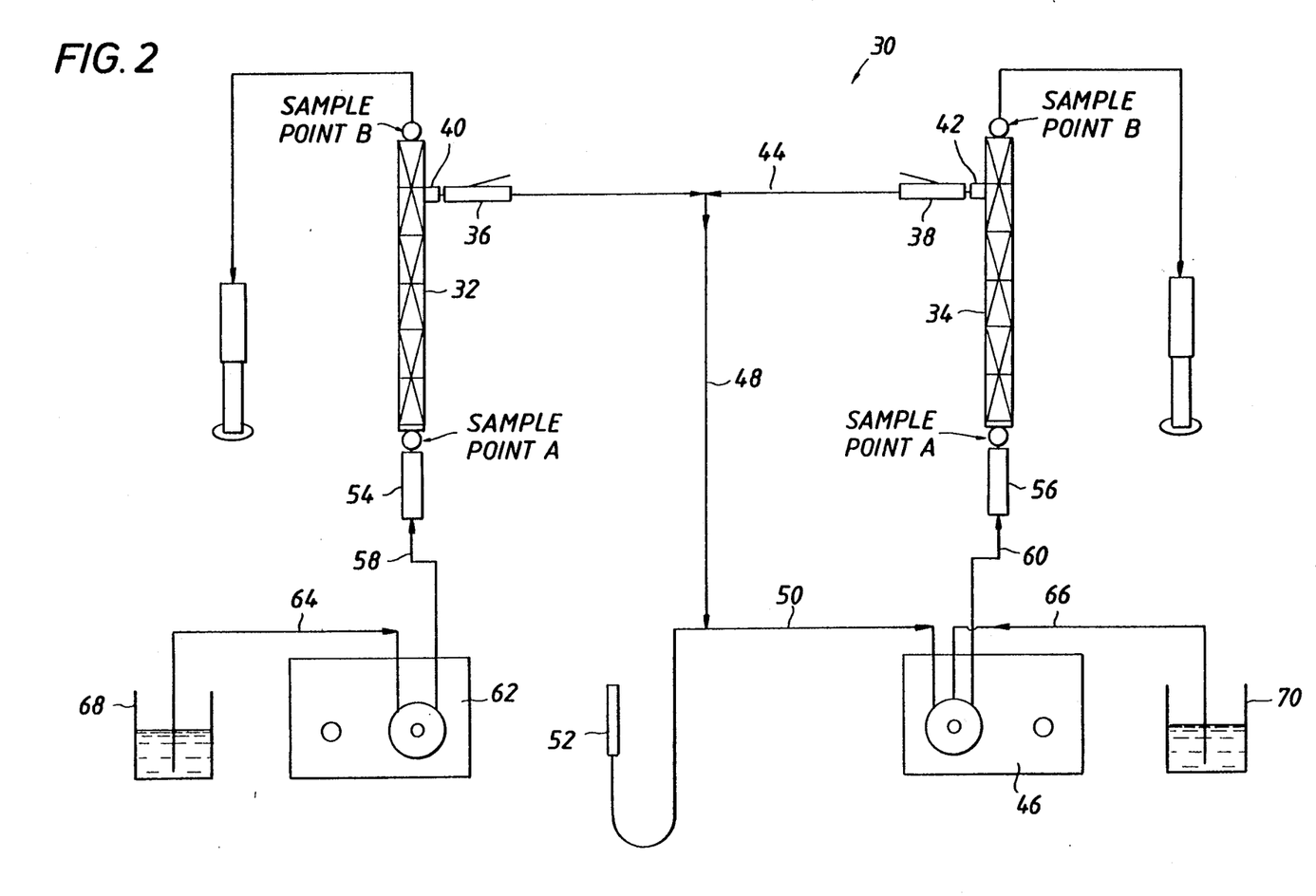
FIG. 2 is a diagrammatic representation of an acid gas separator test stand which is constructed in accordance with the teachings of the present invention.

With reference now to FIG. 2, a schematic illustration of a test stand for inorganic carbon separator testing is shown generally at 30, which test stand was employed during the tests set forth herein. The test stand is designed to conduct simultaneous tests for differing solid-phase acids or differing membranes. For example, as noted in FIG. 2, the test set-up on the left side of the figure is a tetrafluoroethylene (TFE) degasser while the test set-up on the right side of the figure is a siloxane degasser. Test columns 32 and 34 each define sample points A and B and have silica gel capsules 36 and 38 at the vacuum connections 40 and 42 thereof. The capsules 36 and 38, which define effluent filters in the vacuum lines to trap water drawn away from the separator are coupled to a vacuum line 44 which receives vacuum developed by a double-head peristaltic pump 46 via vacuum lines 48 and 50. Arrows on the vacuum lines designate the direction of flow. A mercury manometer 52 is coupled with vacuum line 50 to provide a visual indication of the vacuum being developed by the pump 46.

Solid phase acid columns 54 and 56, being packed with an appropriate solid-phase acid are coupled at the respective sample points A of the degasser chambers 32 and 34. Pressure lines 58 and 60 provide for application of pressure from the respective peristaltic pumps 58 and 46. Suction lines 64 and 66 of the respective peristaltic pumps are coupled with challenge reservoirs 68 and 70 within which is provided a candidate inorganic carbon solution. As mentioned in connection with the water vapor transmission rates described herein, the weight gained by the capsules, minus an initial estimated weight of water vapor in each degasser chamber, would equal the weight of water transmitted across the degasser membrane per unit time.

In operation the peristaltic pumps 62 and 46 are operated to challenge the solid-phase acid bed in the columns 54 and 56 with the inorganic carbon solution of the respective challenge reservoirs 68 and 70. The double-head peristaltic pump 46 also functions to draw vacuum in the vacuum lines 44, 48 and 50 to develop the desired pressure gradient across the solid-phase acid column. The candidate solid-phase acid composition lowers the pH of the inorganic carbon solution to convert the hydrolyzed inorganic carbon to a free gas, e.g. $CO_2$. The gas is then separated from the solution stream by the candidate membrane degasser.

Figure 4:
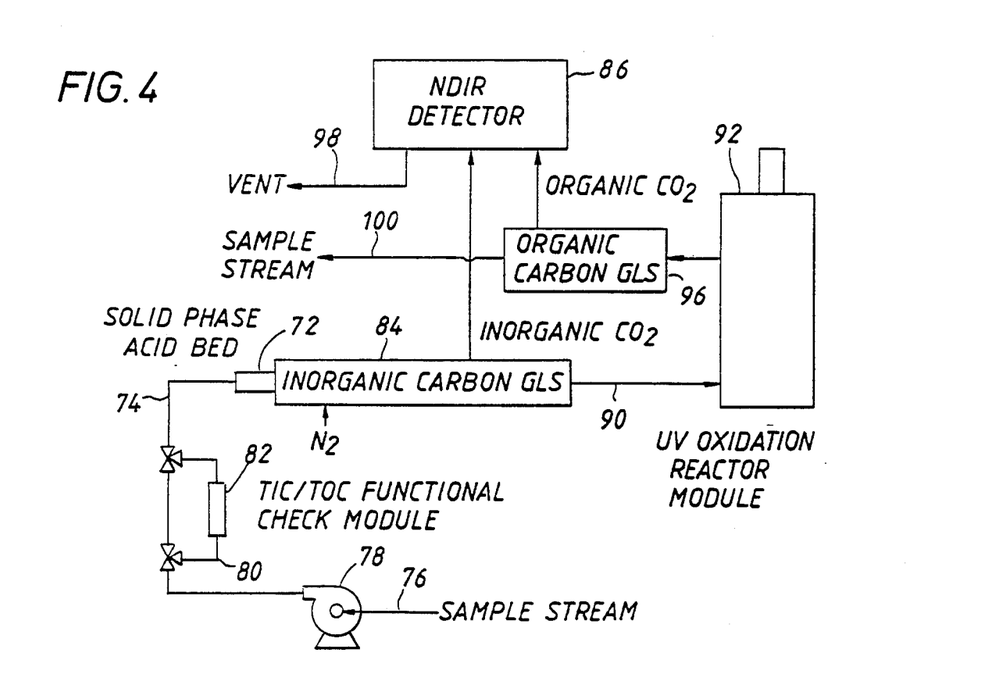
FIG. 4 is a diagrammatic representation of a process and detection schematic of a reagentless solid-phase acid separator.

The schematic illustration of FIG. 4 is a representation of a device for system that is capable of removing acid gas according to the teachings of the present invention. Particularly, the schematic illustration of FIG. 4 is representative of apparatus for removing inorganic carbon present as dissolved $CO_2$ gas, bicarbonate ion, and/or carbonate ion from dilute aqueous solution. As shown in FIG. 4, the device consists of a flow-through solid-phase acid bed 72 which is similar to that shown at 54 and 56 in FIG. 2. The acid bed 72 includes a solid-phase acid of the character described herein being located within a column having a supply conduit 74 to conduct a sample from a sample stream 76 such as may be driven by any appropriate pump 78. The supply conduit 74 is provided with a parallel connected sample inspection conduit 80 having connected therein a TIC/-

TOC functional check module 82. The sample stream from supply conduit 74 is passed through the flow-through solid-phase acid bed which functions to lower the pH of the sample sufficiently to convert any bicarbonate or carbonate present to $CO_2$. The $CO_2$ of the sample is then separated from the sample stream by applying a partial pressure gradient across a $CO_2$-permeable membrane degasser 84. The gas output of the membrane degasser 84 is conducted to a NDIR detector 86 while the sample stream output is conducted by conduit 90 to a UV oxidation reactor module 92 and then to an organic carbon GLS module having its output in the form of a sample stream 100. A portion of the organic carbon GLS module 96 is also directed to the NDIR detector 86 and is then vented via vent conductor 98.

The conversion of carbonate and bicarbonate to $CO_2$ without addition of an expendable liquid reagent such as phosphoric acid is achieved by passing the sample through the flow-through solid-phase acid bed. The solid-phase acid may be either a sulfonated polymer containing adsorbed protons or an inorganic solid. The inorganic acids are of primary interest for Space Station Freedom (SSF) application.

Removal of dissolved $CO_2$ from water without purging the sample with inert gas (a gravity-dependent technique) is achieved using a $CO_2$-permeable membrane. Any combination of pressure/vacuum is suitable, as long as there is sufficient pressure gradient across the membrane to remove the $CO_2$ from the liquid stream and transfer it to the NDIR detector 86 which is coupled by output conduit 88 to the membrane degasser.

The equilibrium for $CO_2$ dissolved in water is shown below, where $K_1 = 10E - 6.3$ and $K_2 = 10E - 10.3$ in dilute solution at 25° C.

The influence of pH on this equilibrium is shown in Table 2-1. For the purpose of adequate TIC removal from product water, the pH should be reduced to less than 3.9. This is determined by calculating the amount of TIC present as $HCO_3$ at a specific pH according to the expression:

$$[HCO_3^-] = [TIC] \frac{K_1[H^+]}{(K_1K_2 + K_1[H^+] + [H^+]^2)}$$

It is reasonable to expect that membrane gas/liquid separation of post-treated ECLSS water will remove inorganic carbon to a level of 1 mg/l or less. Assuming then a maximum sample TIC concentration of 10 mg/l, all but 40 ppb is present as dissolved $CO_2$ at pH 3.9, which is below the PCWQM detection limit of 50 ppb. Currently, the solid acids under development lower the sample pH to a range of about 2.8 to 3.8.

The solid-phase acid materials, when hydrated, form hydroxy compounds M—O—H. Acidic behavior of this group is determined by the size, electron configuration and charge (oxidation state) of the metal atom. A high charge and small size of the metal atom draws electrons toward it, strengthening the M—O bond and weakening the O—H bond, causing the hydroxy compound to dissociate as an acid, i.e., a proton and a metal oxide anion. Specifically, the goal is a material that reduces the pH of the sample stream to a value of 3.9 or less and exhibits minimal water solubility (hence long life). Particular advantages provided by use of an insoluble inorganic solid-phase acid material are:
simplicity of operation
suitable for configuration within an Orbital Replacement Unit (ORU)

elimination of corrosive liquid acids essentially an "on-demand" source of acidification, i.e., the solubility of the material increases with increasing alkalinity. The result is an acidifier that is minimally consumed when the sample stream pH is already low and produces more acidity if the influent pH increases.

In the current SSF PCWQM configuration, three minutes residence time are allocated to the acidifier. At a 1 ml/min flow rate, the bed size is determined by the void volume at changeout to be 6.0 cc maximum. At the current state of development, a 6 cc solid-phase acidifier suitable for commercial use will process (to a pH of 3.85 or less) over 90 liters of product water at atmospheric equilibrium, containing 1-2 mc/l TIC. The operational life of a given solid phase acid bed and/or reagentless separator unit will primarily be dependent upon total sample volume, TIC concentration, and sample pH. The use of iodine as a disinfectant in ECLSS water systems is advantageous in that it lowers relatively contaminant-free product water to a pH of 5-6. This will create less demand for the solid-phase acid and decrease its rate of dissolution.

The polymeric acids used in this device are chemically inert and stable and are effective acidifiers. The operational life per unit volume is lower for the polymeric than for the inorganic acids. For ultra-pure water applications where extreme analytical sensitivity is desired, the use of inorganic materials would probably be preferred. However, the polymerics have good flow characteristics and have the potential for being regenerated in place if necessary.

Figure 3:
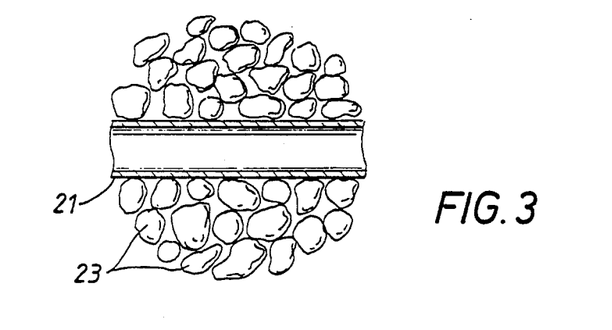
FIG. 3 is a fragmentary sectional view of an alternative embodiment of this invention showing an acid permeable membrane separator for passive total inorganic carbon removal.

PASSIVE TIC REMOVAL—A further development is the fabrication and testing of a passive TIC removal module, diagramed in FIG. 3. This device is of the general configuration of the acid-gas separator of FIG. 1 with a membrane degasser of the construction shown in FIG. 3. This passive TIC removal device is suitable for applications where simplicity and reliability are vital and knowledge of inorganic carbon concentrations in samples is not needed. The device is essentially a reagentless separator containing a $CO_2$ adsorbent on the permeate side of the membrane. Constant removal of the $CO_2$ gas from the permeate side of the membrane ensures a concentration gradient to drive the diffusion of $CO_2$ across the membrane. Neither purge gas nor vacuum are required to remove $CO_2$ from the permeate side of the membrane. The device is an option for the PCWQM, where no requirement to measure TIC exists.

TOC/TIC FUNCTIONAL CHECK MODULE— Solid-phase TIC and TOC functional check modules have been fabricated and tested. The goal is to improve standard stability and decrease instrument volume by eliminating the need for liquid standard reservoirs and additional hardware required to introduce the standard solution into the PCWQM. The solid-standard modules are fixed beds that impart consistent amounts of organic and inorganic carbon to an influent stream (such as system product water). The concentration of TOC and TIC imparted to the stream is affected by both temperature and pH; the design incorporates automatic compensation and influent conditioning for these parameters. These modules are integrated as shown in FIG. 1.

There are two general methods for measuring TOC in the presence of inorganic carbon. These are 1) removal of TIC by acidification and purge followed by oxidation of organics to $CO_2$; and 2) differential measurement, whereby the sample stream is split, one portion is oxidized to give a total carbon measurement, the other portion is measured directly to give TIC, and TOC is calculated by difference. Differential measurement is less precise and less accurate for sample streams containing significantly higher concentrations of TIC than TOC. For example, a $CO_2$ signal from a 500 ppb TOC sample would be very imprecisely measured if the sample also produced a $CO_2$ signal from 5,000 ppb TIC, measured with an accuracy of +/- 5 or 10%. This common scenario has a high degree of likelihood that the TOC signal would be lost in the uncertainty of an infrared or conductivity detector. For this reason an adaptation of the standard method was desired.

TEST METHODS/RESULTS

Reagentless Separator—Data from solid-phase acid materials testing are shown in Table 3.1B. The data show that at the specified conditions, an effluent pH less than 3.9 is attainable for a minimum of 15 liters per cc of acid bed. Other solid acids under development exhibit considerably longer life, however the effluent pH of these materials is generally 4.0 to 4.2. Further variations of the manufacturing methods, producing materials of differing composition and structure are being investigated.

Membrane degassing modules have been developed for removal of $CO_2$ from the sample for both TIC and TOC applications. Silocone-based, polypropylene, and fluoropolymer membranes are used. TIC concentrations of up to 100 mg/1 (370 mg/1 $CO_2$) are removed to below detection limits (100 ppb) of a commercial TIC/TOC analyzer. Prototypes of a reagentless separator, consisting of a solid-phase acid bed and a membrane separator, designed to remove inorganic $CO_2$ from water, have been fabricated and tested. Configurations have been demonstrated incorporating solid polymeric acids and solid inorganic acidifiers.

Organic recovery tests were performed to assess the potential of the reagentless separator components to lose or adsorb organic contaminants from a sample stream. Loss of organics during the TIC removal phase of the process results in lower than actual TOC readings, therefore it is desirable that use of the reagentless separator result in maximum recover. Several compounds were selected from challenge tests based on (1) their likelihood of presence in the product water, and (2) basicity, to determine if basic compounds such as amines would be adsorbed by the solid acids.

Analysis for methanol, ethanol, acetone, and isopropanol was by gas chromatography; acetic acid and triethyl amine recoveries were determined using TOC analysis.

Figure 5:
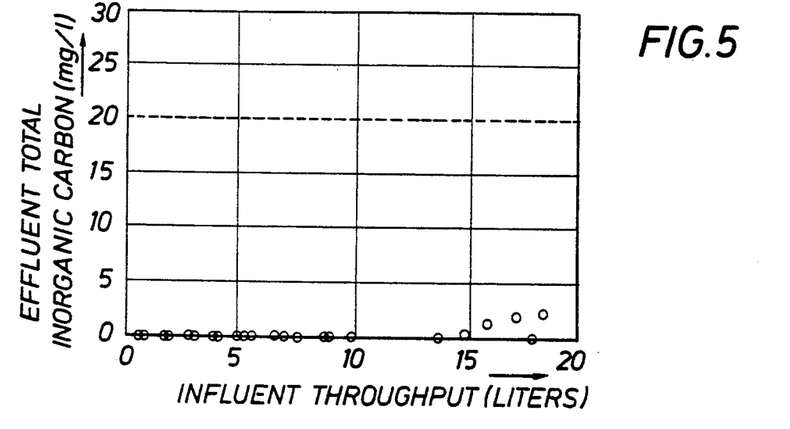
FIG. 5 is a graphical representation of a challenge test of a passive total inorganic carbon removal module constructed in accordance with the present invention.

PASSIVE TIC REMOVAL—Test data from a passive TIC removal device are shown in Table 2-1. This device provides maximum simplicity, does not require a purge gas, and does not allow TIC measurement. The $CO_2$ is constantly removed from the permeate side of the membrane by chemisorption, by the general reaction $M_xO + CO_2 \rightarrow M_xCO_3$. The operational life of this module is dependent upon the influent TIC concentration, and the device can be sized based on worst-case TIC levels expected in the sample water. See FIG. 5.

Figure 6:
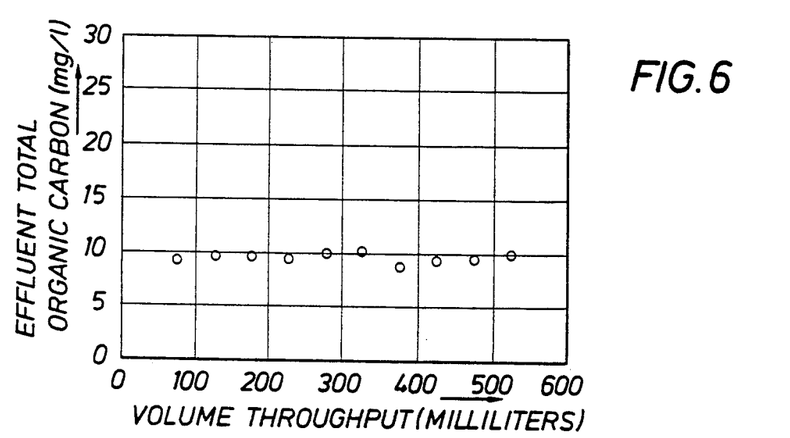
FIG. 6 is a graphical representation of total organic carbon versus volume throughput of an effluent in a total organic carbon function check module according to the present invention.

TOC/TIC FUNCTIONAL CHECK MODULES—Prototype solid-phase TOC and TIC functional check modules have been developed and demonstrated. Data from a TOC module designed to impart 10 pm TOC are shown in Table 3-10. In light of recent changes to a single loop, combined wastewater processor, further effort is planned to develop a TOC and TIC module that imparts a carbon concentration an order of magnitude lower than that shown in FIG. 6.

CONCLUSIONS/SUMMARY—Reagentless separator prototypes have been successfully demonstrated to remove TIC from sample water to low pb levels. The preferred configuration consists of a solid-phase inorganic acid integrated with a hydrophobic, hollow fiber membrane degasser to acidify the sample water and remove inorganic carbon as $CO_2$ in one flow-through process. Losses of organic contaminants during TIC removal were observed to be significantly less than the current standard method for TIC removal. The inorganic carbon can be carried to a detector using a non-absorptive purge gas. In a different configuration, the reagentless separator is fabricated to contain a $CO_2$ adsorbent on the permeate side of the membrane, to remove $CO_2$ from the gas phase and provide a continuous driving force for the diffusion through the membrane. This device, essentially a passive TIC removal module, is suitable for applications where TIC monitoring is not necessary and simplicity and/or minimal pumping or purge gas usage are dominant factors in instrument design. A further development is the successful testing of a solid-phase TOC functional check module. The first generation module is designed to impart 10 mg/1 TOC to an influent stream (i.e. product water) to use as a functional check or insitu TOC standard to periodically verify instrument performance. Further development and testing for application to Space Station Freedom PCWQM hardware is indicated.

MATERIALS, METHODS AND TEST RESULTS

Initial studies involving solid-phase acids for use in conjunction with this invention consisted of batch tests to determine equilibrium pH values for candidate acids immersed in deionized water and/or bicarbonate solutions. The following solid-phase acids were tested:

Inorganic Acids:
Molybdenum (VI) oxide - $MoO_3$
Tungsten (VI) oxide - $WO_3$
Molybdic Acid - ammonium dimolydate
Tungstic Acid - $H_2WO_4$
Cupric Oxide/Phosphoric Acid
Polymeric Acids:
Sulfonated polymer (Nafion) pellets
Polymeric acid (Amberlite 200 ($H^+$))

Figure 7:
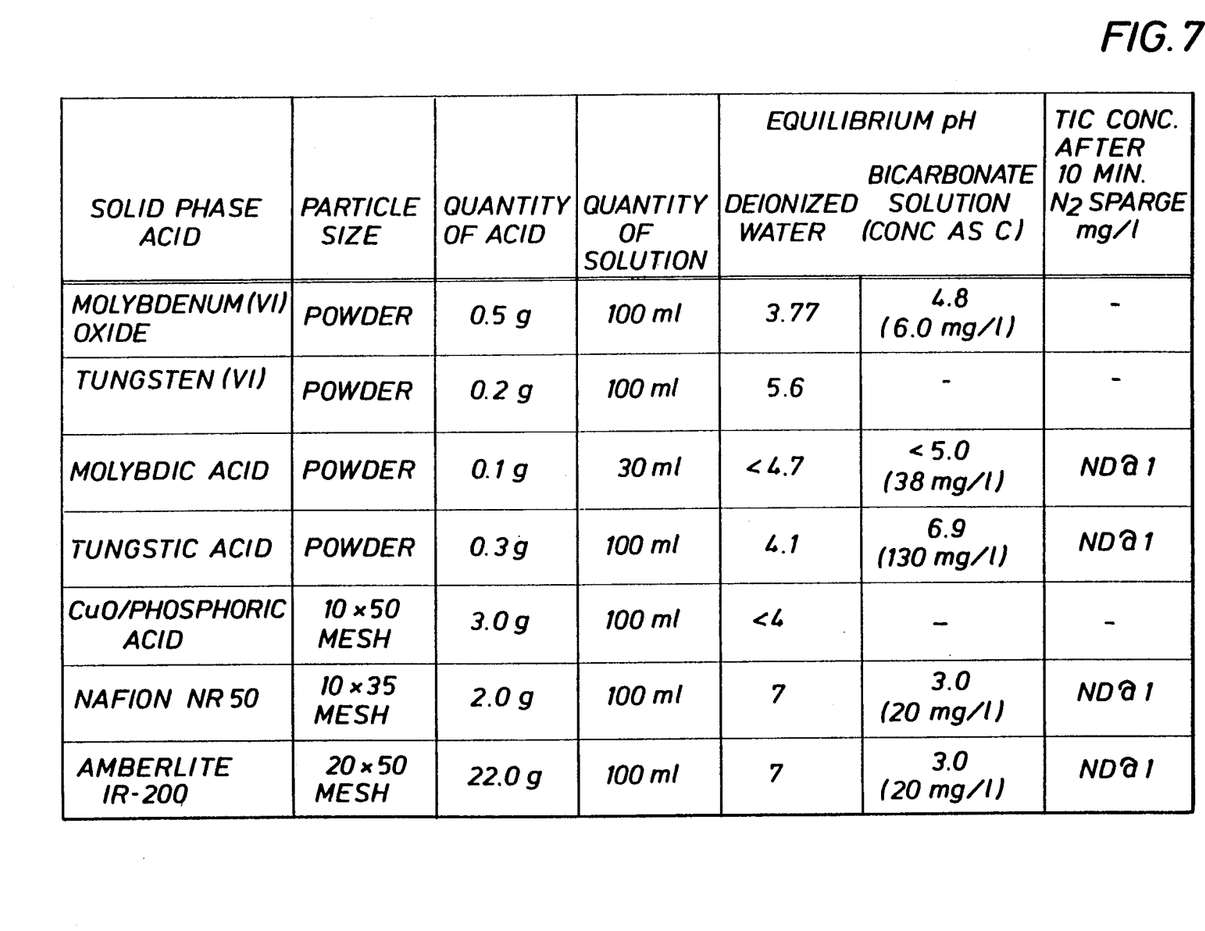
FIG. 7 is a table identifying initial screening tests of solid-phase acids considered acceptable for this invention.

The tests consisted of adding a quantity of the acid to the solution, with stirring, and measuring the pH of the solution at several different time intervals. Data are shown by the table shown in FIG. 7.

The results from the initial screening tests indicated that the molybdic acid, tungstic acid, Nafion and Amberlite 200 are materials that would be suitable for this application. Using these materials, column tests were performed, as representative examples within the scope of the present invention, to evaluate solubility of the packed solid-phase acid bed, flow characteristics, acid bed life and effluent pH. The following examples were carried out by passing a flow of a sample influent containing organic and inorganic carbon through a column containing a selected solid-phase acid bed with the effluent of the acid bed being passed through a $CO_2$ permeable membrane degasser with which the acid bed column is integrated. The $CO_2$ was then separated from the sample stream by applying a partial pressure gradient across the membrane, after which the sample stream was measured to determine total organic carbon and total inorganic carbon. Test configurations employed in conjunction with the following examples are more specifically identified hereinbelow as test configurations 1 and 2. These tests are detailed, by material, as follows.

EXAMPLE 1

Tungstic Acid

Figure 8:
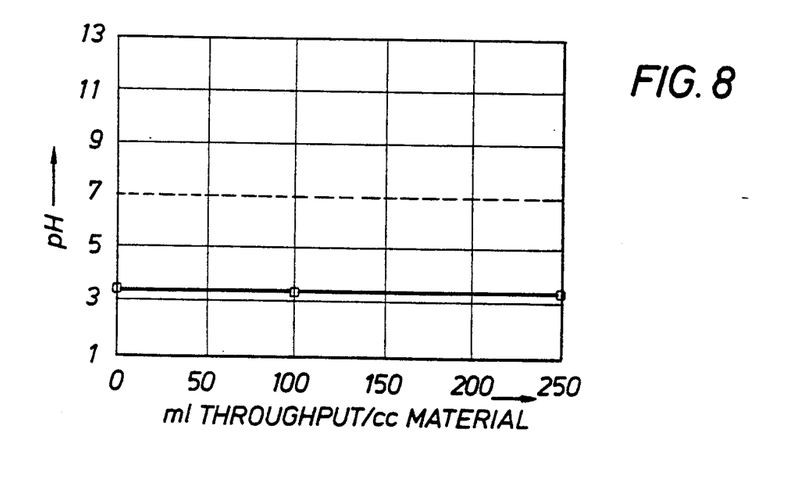
FIG. 8 is a graphical representation of a tungstic acid solid-acid solid column test according to the present invention.

Tungstic Acid, $H_2WO_4$, posses several attractive characteristics for this application. These include minimum water solubility, increasing solubility in base, and a $pK_a$ of approximately 3.5. These properties create the potential for a flow-through bed that provides acidity on demand to a pH of <4. Date are shown in Table 3-1A, set forth below for a column containing 0.1cc challenged with 20 mg/1 inorganic carbon present as bicarbonate. The major disadvantage to using the tungstic acid is high pressure drop due to the small particle size. To reduce the pressure drop, further effort was required to develop larger discrete particles of the tungstic acid. This was achieved by manufacturing pellets using physical methods and using chemical binders. See FIG. 8.

EXAMPLE 2

Molybdic Acid

Figure 9:
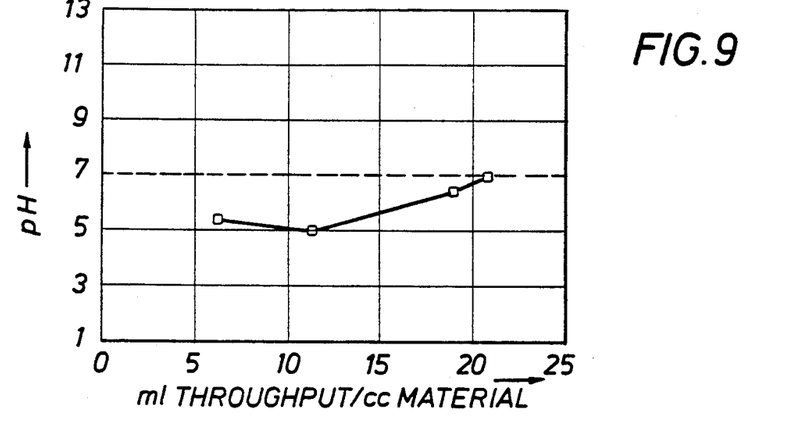
FIG. 9 is a graphical representation identifying pH versus volume throughput of molybdic acid on a solid acid column test of R-648 diatomacious earth.

Molybdic acid was evaluated. This material is slightly soluble in water, and has a $pK_a$ of approximately 3.6. A granular material prepared for this purpose is shown in Table 3.1B to provide an effluent pH of 2.8–3.9 during the test period. This material is immediately suited for use as a solid-phase acidifier. See FIG. 9.

EXAMPLE 3

Amberlite 200 (H+)

Figure 10:
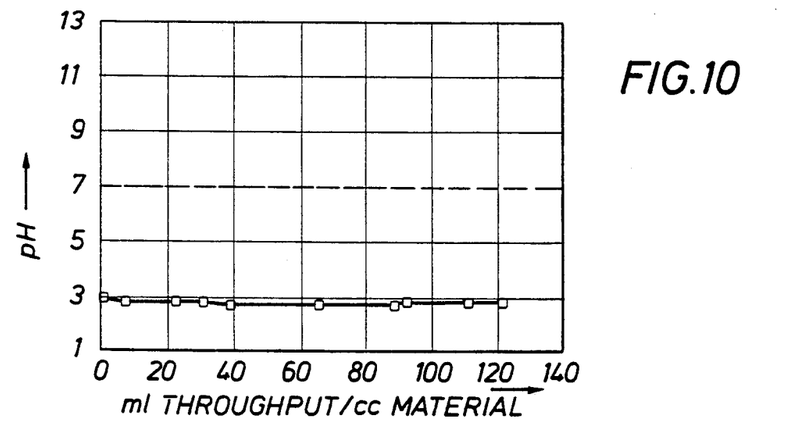
FIG. 10 is a graphical representation identifying pH versus volume throughput of Amberlite IR 200($H^{30}$) as the result of a solid acid column test.

The polymeric acid which is sold under the Registered Trademark Amberlite 200 by Rohm and Haas Company, Philadelphia, PA in the hydrogen form was packed into a column and challenged with a 20 mg/1 inorganic carbon solution. The influent's pH was reduced to below 3 for sufficiently large throughputs to make it a candidate for acceptable use in accordance with this invention. See FIG. 10.

EXAMPLE 4

Nafion

Figure 11:
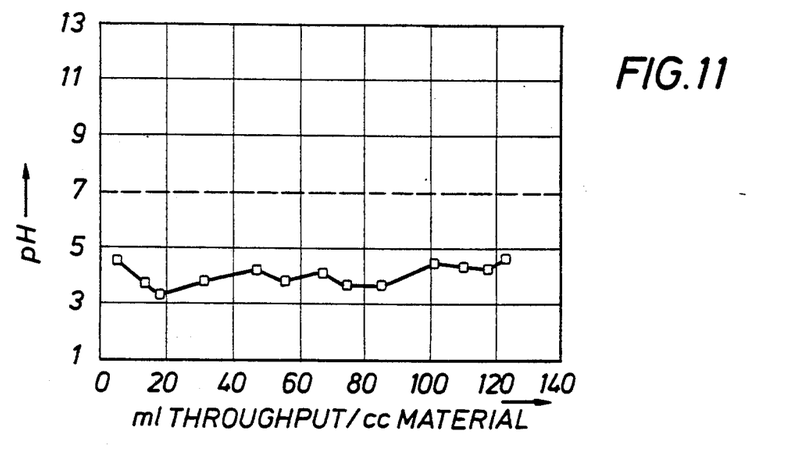
FIG. 11 is a graphical representation identifying pH per volume throughput of a test concerning a Nafion solid acid column.

The sulfonated polymer which is sold under the Registered Trademark Nafion by E. I. du Pont reduced the influent stream's pH to between 3 and 4 when packed in a column and challenged with a 20 mg/1 inorganic carbon solution. Similar throughputs as Amberlite 200 were observed, however the effluent pH from Nafion was less consistent than from Amberlite. See FIG. 11.

MEMBRANE DEGASSER DEVELOPMENT

The best membrane degassing material and configuration was found during the tests by assessing manufacturer's data on numerous materials, acquiring likely candidates and testing their ability to remove dissolved $CO_2$ in fabricated prototypes.

The following materials and configurations appear useful as $CO_2$ degasser membranes:
  Polydimethylsiloxane (Siloxane)—Tubing
  Fluorinated Ethylene-propylene (FEP)—film and tubing
  Tetrafluoroethylene (TFE)—film and tubing
  Perfluoroalkoxy (PFA)—tubing
  Polypropylene—film and tubing Both non-porous and microporous membranes are useful. Hollow fiber and flat sheet degasser prototypes of these materials were constructed and subjected to dissolved $CO_2$ in distilled water streams. A pressure gradient (vacuum) was maintained across the membrane to remove the $CO_2$.

Figure 12:
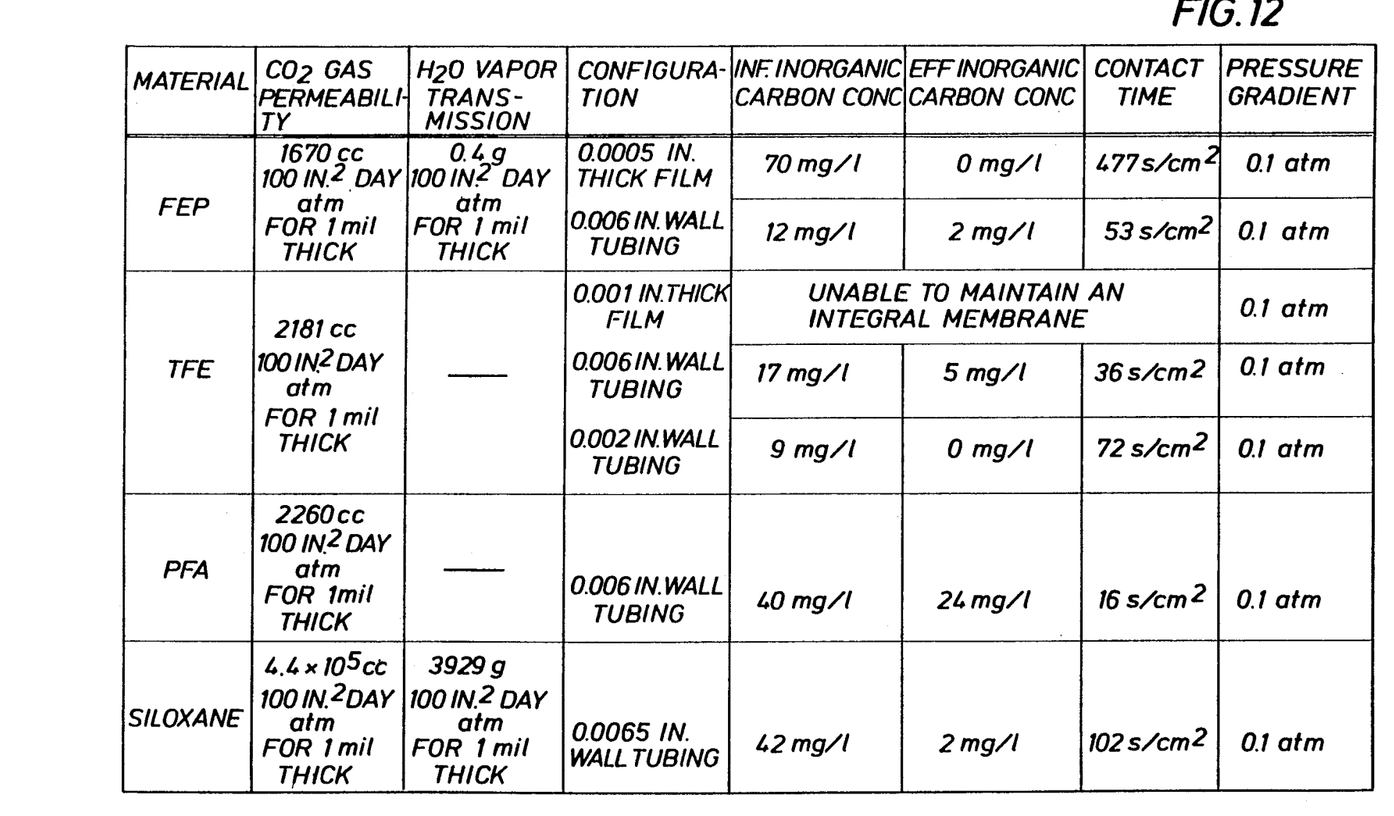
FIG. 12 is a chart identifying relative manufacturer's data concerning degasser membrane materials that may be utilized within the scope of the present invention.
Figure 13:
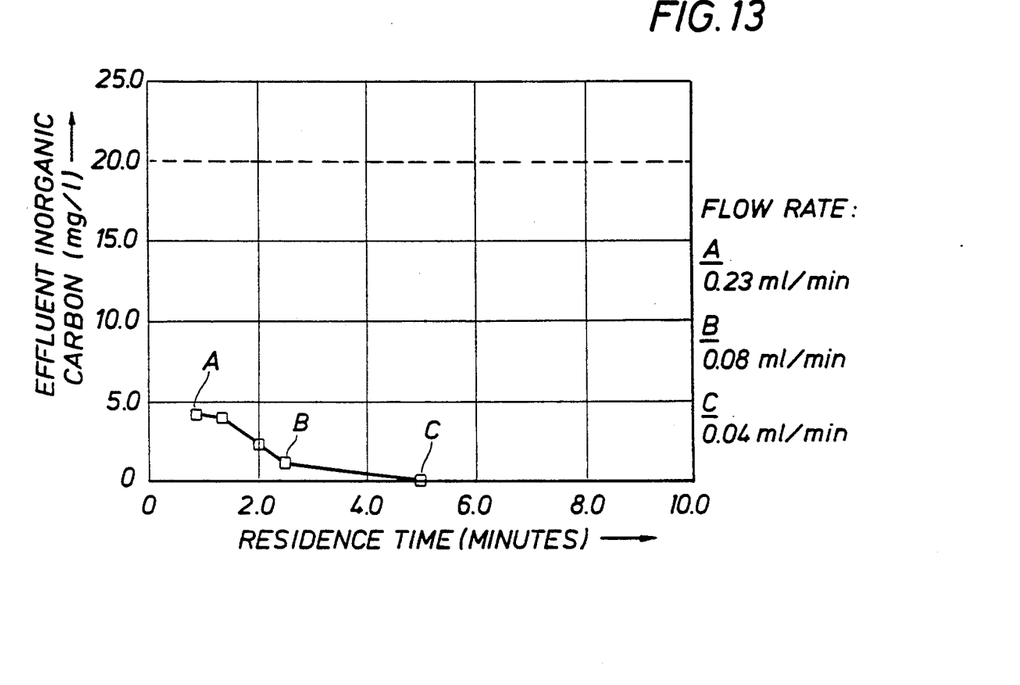
FIG. 13 is a graphical representation representing inorganic carbon effluent versus residence time for an Amberlite IR 200 ($H^+$) acid bed having a Siloxane tubing degasser.

Inorganic carbon concentrations in the challenge stream were measured before and after contact with the degassing membrane. Manufacturer's data and experimental results for these materials are presented in of FIGS. 12 and 13 respectively.

Results from these tests suggest that 6.5 mil thick walled siloxane tubing and 2 mil thick walled TFE tubing degassers would be the best candidates for further testing and development. Details of testing these two degasser prototypes follow.

EXAMPLE 5

SILOXANE MEMBRANE DEGASSER

A degasser was constructed using one continuous length of 0.031 cm ID siloxane tubing. One continual length of tubing was found to function better than a bundle of shorter lengths due to the preferential sample flow through tubes in the center of a large fiber bundle. The following table illustrates the results of challenging the solid acid and membrane degasser system with a 20 mg/1 inorganic carbon challenge stream. The small amount of material and short residence time required to remove all the inorganic carbon are attractive advantages of the siloxane membrane degasser. See FIG. 13.

EXAMPLE 6

TFE Membrane Degasser

Figure 14:
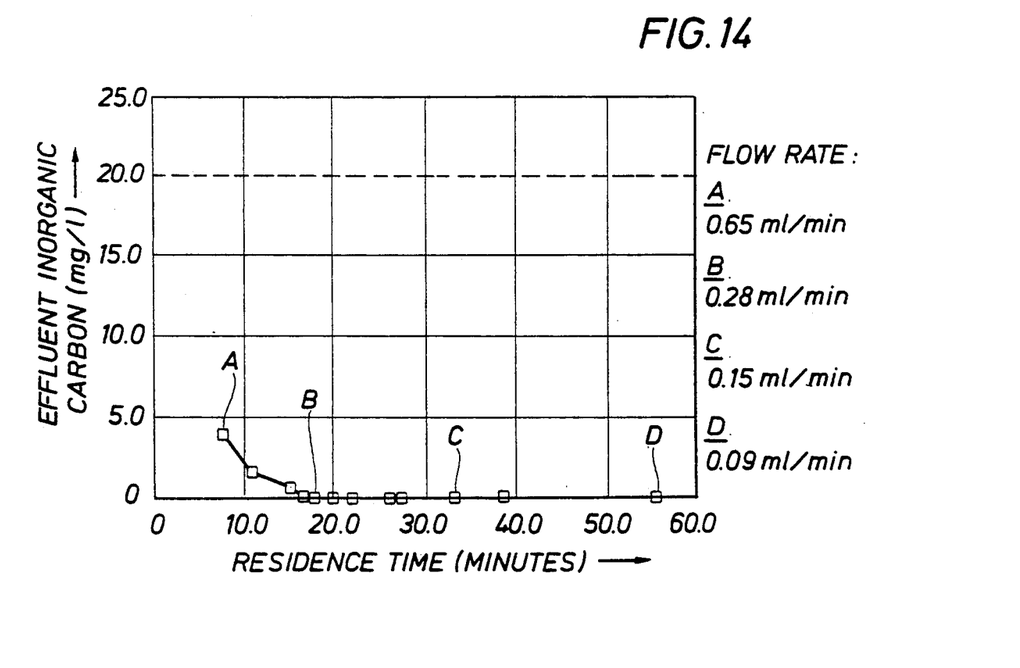
FIG. 14 is a graphical representation identifying volume of inorganic carbon effluent versus residence time for an Amberlite IR 200 (H+) acid bed having a TFE tubing degasser.

Small bore, 2 mil thick walled TFE tubing was also fashioned into a single tube degasser by winding the tubing over a porous support and fixing in a hollow fiber reactor chamber. Due to TFE's comparatively low $CO_2$ permeability, a tube ten times the length of the siloxane degassers was used. This increased amount of necessary material results in sample residence times in excess of fifteen minutes as shown by the following chart. See FIG. 14.

EXAMPLE 7

Solid Acid and Membrane Degasser Integrated Tests

The inorganic carbon separator's performance over extended periods of time and under varying challenge stream compositions is important to its acceptance as Water Quality Monitor (WQM) Hardware. The test system shown in the Drawing is made up of an integrated $CO_2$ separator, consisting of an Amberlite 200 (H+) solid acid bed and either a Siloxane or TFE degasser, peristaltic pumps and associated tubing. The system was used in the following tests a. Inorganic carbon removal over the life span of one acid bed.
b. Membrane degasser water vapor transmission rate.
c. Reduction of organic carbon concentrations during inorganic carbon removal.

Details of these tests and their results are contained in the following sections.

EXAMPLE 8

Life Tests

Figure 15:
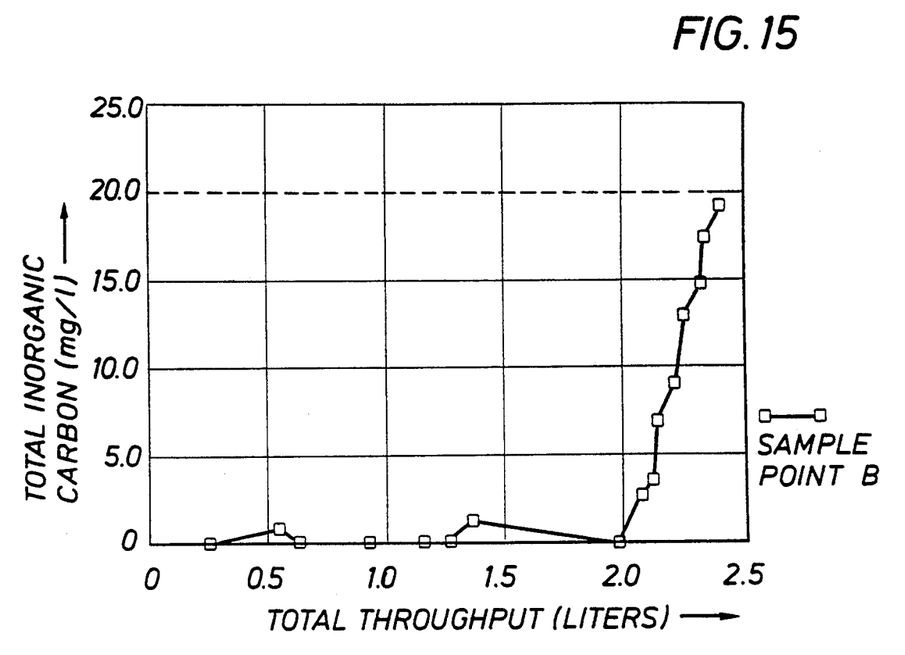
FIG. 15 is a graphical representation of TFE inorganic carbon separator life test results from the standpoint of volume of total inorganic carbon versus total volume of throughput.
Figure 16:
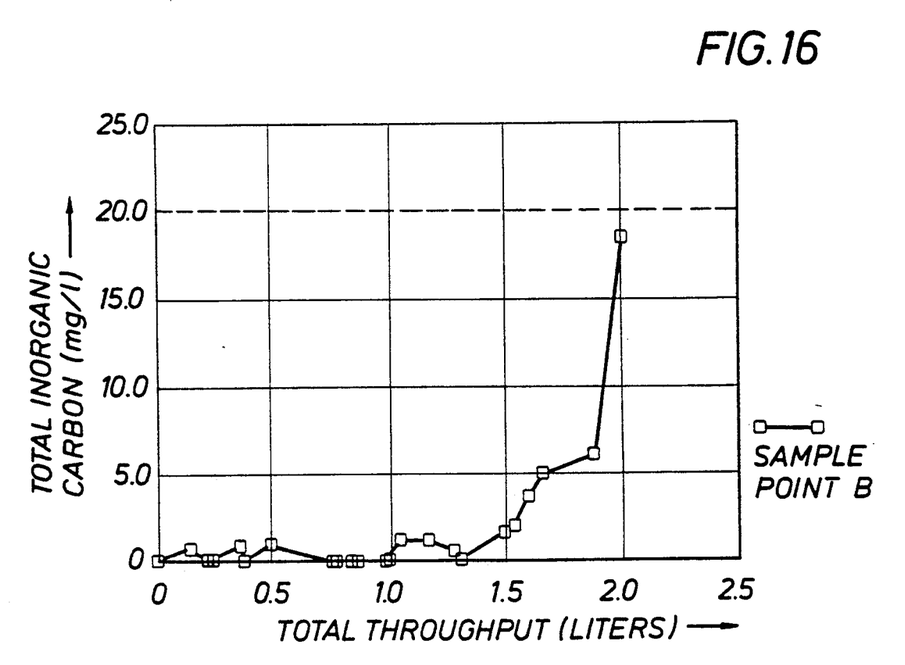
FIG. 16 is a graphical representation identifying total inorganic carbon volume versus volume of total throughput in conjunction with life test results according to the present invention for a Siloxane inorganic carbon separator.

Both the siloxane and TFE degassers with freshly prepared Amberlite 200 (H+) columns were challenged with a 20 mg/l, pH 8.4 inorganic carbon solution until exhaustion of the acid bed. The separators were operated at flow rates and differential pressures which ensured removal of the inorganic carbon to less than 1 mg/l. As shown in the Drawings, both units function through 0.5 liters challenge throughput per cubic centimeter of material. See FIGS. 15 and 16.

EXAMPLE 9

Water Vapor Transmission Rates

A minimum amount of water vapor transmission across the membrane is desired for operation in a closed environment. To test the units, silica gel capsules were placed in the vacuum lines to trap water drawn away from the separators. The weight gained by these capsules, minus an initial estimated weight of water vapor in each degasser chamber, would equal the weight of water transmitted across the membrane per unit time. The TFE and siloxane degassers were operated at ambient temperature for two days with the results shown in Table 3-7.

TABLE 3-7

EXPERIMENTAL WATER PERMEABILITY

| Degasser Material | Active Area | Sample Flow Rate | Vacuum Gradient | ugH$_2$O/Min |
|---|---|---|---|---|
| TFE | 550 cm$^2$ | .25 ml/min | 0.3 atm | 7 |
| Siloxane | 550 cm$^2$ | .25 ml/min | 0.3 atm | 33 |

EXAMPLE 10

Organic Compound Recovery Tests

Figure 17:
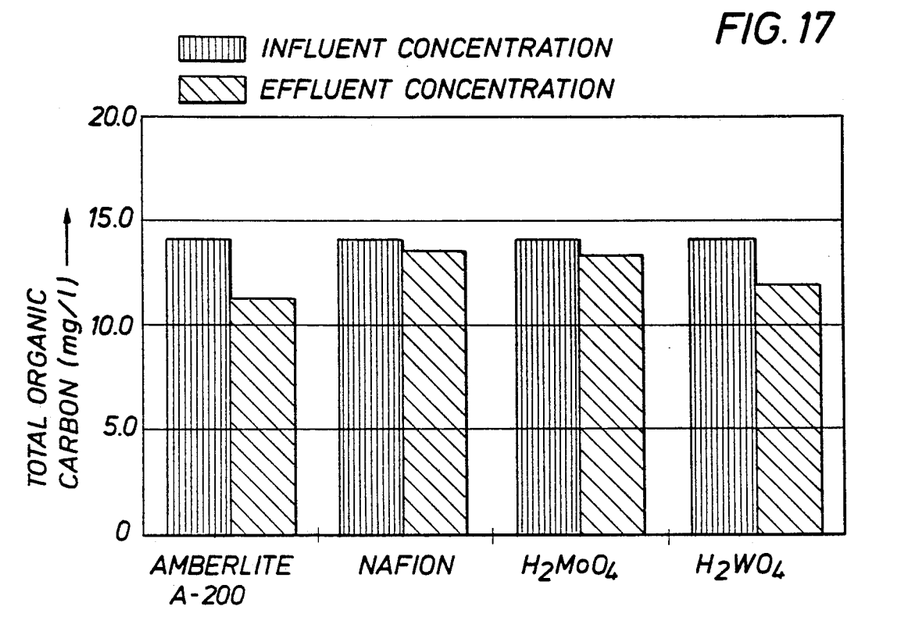
FIG. 17 identifies a graphical table for a triethylamine challenge test of solid phase acids according to this invention.
Figure 18:
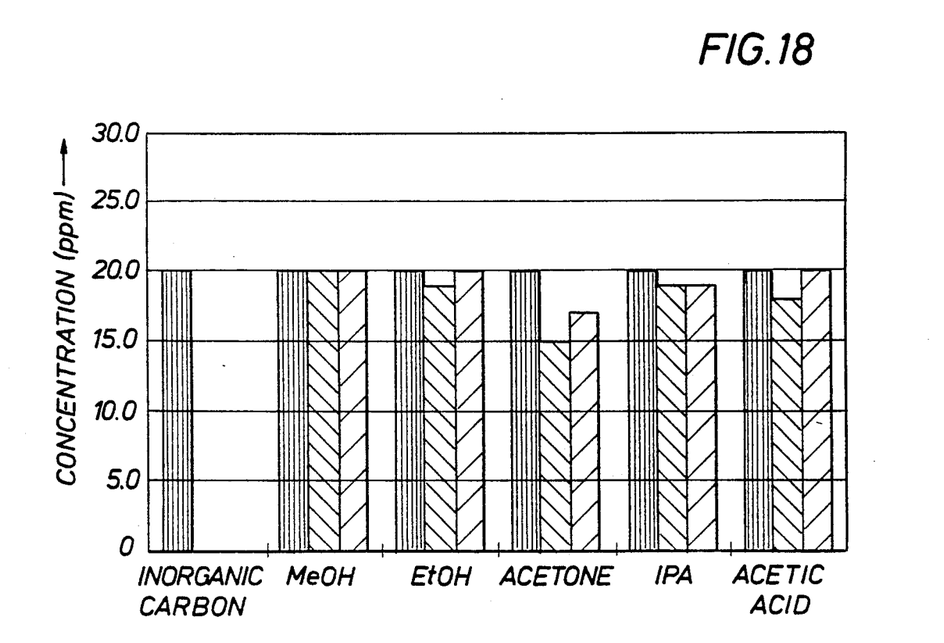
FIG. 18 identifies a graphical table for a triethylamine challenge test of inorganic carbon separators accord to this invention.

Both separators with Amberlite beds attached were challenged with 20 ppmv of solutions containing methanol, ethanol, acetone, isopropanol and acetic acid to determine if concentrations of these organics were reduced by the acid or degasser component during inorganic carbon removal. Effluent concentrations of methanol, ethanol, isopropanol and acetic acid approximated those of the influent streams for both the TFE and siloxane degassers indicating no loss during inorganic carbon removal by either the acid or degassing component for these contaminants. Concentrations of acetone, however, were slightly reduced by both the TFE and siloxane degassing components. These results are summarized in the tables of FIGS. 17 and 18. It should be noted that the loss of acetone through the membrane is significantly less than the loss of using purge gas to remove CO$_2$. The membrane degasser can therefore be expected to provide more accurate results on samples containing volatiles than the current commercial method.

Recovery tests were also performed using triethylamine challenge solution. The purpose of the test was to determine whether a basic amine would be adsorbed by the solid-phase acid. The solid acids (1-2g each) were added to 20 mg/l amine solutions and stirred. The triethylamine concentration was then measured using conventional TOC, total organic carbon technology, to determine recovery. Packed beds were also challenged with triethylamine solutions. The data indicate minimal removal of the amine by the solid acids.

CONCLUSIONS

The tests performed indicate that a substantial improvement in the Water Quality Monitor (WQM) technology is possible through further development and incorporation of the reagentless separator technology. For application to microgravity, the separator provides a simpler, safer means for inorganic carbon removal. The membrane degasser is also suitable for removal of CO$_2$ from the organic oxidation process.

Three solid-phase acids, Amberlite 200, molybdic acid, and tungstic acid have been identified as being especially suitable for use in accordance with the teachings of this invention. The inorganic acids are manufactured in a form that is suitable for use in a flow-through solid-phase acid bed. The operational life of the inorganic acids are dependent on total sample throughput and pH. Tungstic acid's virtual insolubility in neutral and acid solution translates into a maximum operational life of the material. Along with its increasing solubility in base, this provides an "on-demand" acid source. The tungstic acid is slowly used and is suitable for use as with the Orbital Recovery Unit (ORU) for use on board orbital and interplanetary space craft such as Space Station Freedom. The material is not corrosive and the units can be handled easily in microgravity.

The polymeric acid operational life will depend on the total sample volume and concentration of cations in the sample stream. These materials would have significantly greater life when used in ultra-pure or potable water systems compared to hygiene water system that contains, e.g., a significant sodium concentration.

The polymeric acid has the potential to be regenerated using acid generated from an electrolytic process. This could be necessary in the case where the processing time for samples would dictate a minimal bed size, or where replacement of the units was not practical.

The non-porous membrane degassers manufactured from polydimethylsiloxane, polypropylene, and tetrafluoroethylene were effective at removing CO$_2$ from the aqueous streams. The polypropylene is more highly permeable to CO$_2$, water vapor and organics than the tetrafluoroethylene. The results of testing indicate that the polypropylene or siloxane is the best choice when reduced processing time and/or lower pressure gradient are required. To achieve higher selectivity for CO$_2$ transmission vs. water vapor and organics, the tetrafluoroethylene would be used. The TFE requires a four-fold increase in contact time, surface area, or pressure gradient to achieve the same CO$_2$ removal as the siloxane.

The operational life of the solid-phase acid bed and/or reagentless separator unit will be dependent upon total sample volume and sample pH. In the pH, the use of iodine as a disinfectant in ECLSS water systems is advantageous in that it lowers the pH of relatively contaminant-free water to a pH of 5-6. This will create less demand for the solid-phase acid by decreasing its rate of dissolution.

The polymeric acids are chemically inert and stable and are effective acidifiers when used in the hydrogen form. The operational life per unit volume is lower for the polymeric acid than for the inorganic acids. However, the polymeric acids have good flow characteristics and have the potential for being regenerated in place, if desirable.

Tests in accordance with the present invention were conducted according to the following test configurations:

Configuration 1

The sample stream is pressurized to approximately 7 psig using a syringe loader. The $CO_2$ is driven through the membrane and carried to the NDIR detector using a non-absorptive gas stream or removed using gas-side vacuum.

Any combination of pressure/vacuum is suitable as long as there is sufficient partial pressure gradient across the membrane to remove the $CO_2$ from the liquid stream and transfer it to the NDIR.

Configuration 2

The sample stream is pumped through the reagentless separator and the $CO_2$ is removed by an adsorbent on the permeate side of the membrane.

Particular advantages provided by use of an insoluble inorganic solid-phase acidic material are:

elimination of corrosive liquid acids (the solid-phase materials are non-corrosive)

suitable for configuration as an (Orbital Replacement Unit) ORU simplicity of operation essentially an "on-demand" source of acidification, i.e., the solubility of the material increases with increasing alkalinity. The result is an acidifier that is minimally consumed when the sample stream pH is already low and increases the amount of acid added to the stream as the influent pH increases.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

Having thus described this invention in detail, we claim:

1. A reagentless separator for removal of inorganic carbon from an aqueous solution, comprising:
   means for providing an alternative to a liquid reagent in an acid gas separator including,
   (a) a flow through solid-phase acid bed through which said aqueous solution is passed, said solid-phase acid bed converting hydrolyzed acid gases to the free gas form;
   (b) a gas-permeable membrane degasser for physical separation of said converted gas from said aqueous solution; and
   (c) means developing a partial pressure gradient across said gas permeable membrane for inducing passage of hydrolyzed acid gas from said aqueous solution through said gas permeable membrane.

2. The reagentless separator of claim 1, wherein said flow through solid-phase acid bed is from a group including sulfonated polymer containing adsorbed protons and an inorganic solid.

3. The reagentless separation of claim 1, wherein, said solid-phase acid bed comprises inorganic acid from a group including molybdenum (VI) oxide-$MoO_3$, tungsten (VI) oxide-$WO_3$, molybdic acid-ammonium dimolydate, tungsten acid-$H_2 WO_4$ cupric oxide/phosphoric acid.

4. The reagentless separator of claim 1 wherein said solid-phase acid bed comprises a polymeric acid from a group including polymeric acid and sulfonated polymer.

5. The reagentless separator of claim 1, wherein, said flow through solid-phase acid is from a group including molybdenum (VI) oxide-$MoO_3$, tungsten (VI) oxide-$WO_3$, molybdic acid-ammonium dimolydate, tungsten acid-$H_2 WO_4$ cupric oxide/phosphoric acid, and sulfonated polymer.

6. The reagentless separator of claim 1 wherein said gas-permeable membrane degasser is in the form of a hollow fiber degasser.

7. The reagentless separator of claim 1 wherein said gas-permeable membrane degasser is in the form of a flat sheet degasser.

8. The reagentless separator of claim 1, wherein said gas-permeable membrane is from a membrane group including polydimethylsiloxane, fluorinated ethylene-propylene, tetrafluoroethylene, perfluoroalkoxy, and polypropylene.

9. The reagentless separator of claim 8, wherein said gas-permeable membrane is a non-porous membrane.

10. The reagentless separator of claim 8, wherein said gas-permeable membrane is a porous membrane.

11. The reagentless separator of claim 8, wherein said gas-permeable membrane is composed of hollow fibers.

12. The reagentless separator of claim 8, wherein said gas-permeable membrane is a flat membrane.

13. A process for separation of hydrolyzed acid gases from a solution, comprising:
   provide an alternative to a liquid reagent in and acid gas separator, by
   (a) passing said solution through a solid-phase acid bed for conversion of said hydrolyzed acid gas to free acid gas; and
   (b) passing said solution through a gas-permeable membrane degasser for separation of said free acid gas from said solution.

14. The process of claim 13, wherein said solution is an aqueous solution.

15. The process of claim 13, wherein said solid-phase acid bed is from a group including sulfonated polymer containing adsorbed protons and an inorganic solid.

16. The process of claim 13, wherein said solid-phase acid bed comprises inorganic acid form a group including molybdenum (VI) oxide-$MoO_3$, tungsten (VI) oxide- $WO_3$, molybdic acid- ammonium dimolydate, tungsten acid-$H_2 WO_4$ cupric oxide/phosphoric acid.

17. The process of claim 13, wherein said solid-phase acid bed comprises a polymeric acid from a group including polymeric acid and sulfonated polymer.

18. The process of claim 13, including:
   application of pressure to said solution to establish a partial pressure gradient across the membrane of said membrane degasser to accomplish said passing of said solution through said solid-phase acid bed and to accomplish passing of carbon dioxide from said solution through said carbon dioxide permeable membrane.

19. The process of claim 13, including:
application of vacuum to the permeate side of said acid gas permeable membrane to accomplish said passing of said solution through said solid-phase acid bed and said acid gas through said acid gas permeable membrane.

20. The process of claim 13, including application of pressure to said solution and vacuum to said permeate side of said gas-permeable membrane to accomplish said passing of said gas through said acid gas-permeable membrane.

* * * * *

UNITED STATES PATENT AND TRADEMARK OFFICE
CERTIFICATE OF CORRECTION

PATENT NO. : 5,244,478
DATED : September 14, 1993
INVENTOR(S) : Clifford D. Jolly It is certified that error appears in the above-indentified patent and that said Letters Patent is hereby corrected as shown below:

Column 1, line 5, insert --The invention described herein may be manufactured and used by of for the United States Government, for government purposes without payment or royalty of any kind, under Grant No. NAS-8-38460, by the Marshall Space Flight Center.--

Signed and Sealed this

Eleventh Day of October, 1994

*Attest:*

BRUCE LEHMAN

*Attesting Officer*  *Commissioner of Patents and Trademarks*